Aug. 12, 1969  H. KOMENDOWSKI ET AL  3,460,420
FEED PRESSURE CONTROL SYSTEM FOR HINGE TYPE HORIZONTAL BANDSAW
Filed Sept. 19, 1966  4 Sheets-Sheet 1

INVENTORS
FREDERICK J. BLUM, JR.
HENRY KOMENDOWSKI
by: Wolfe, Hubbard, Voit & Osann
ATTYS.

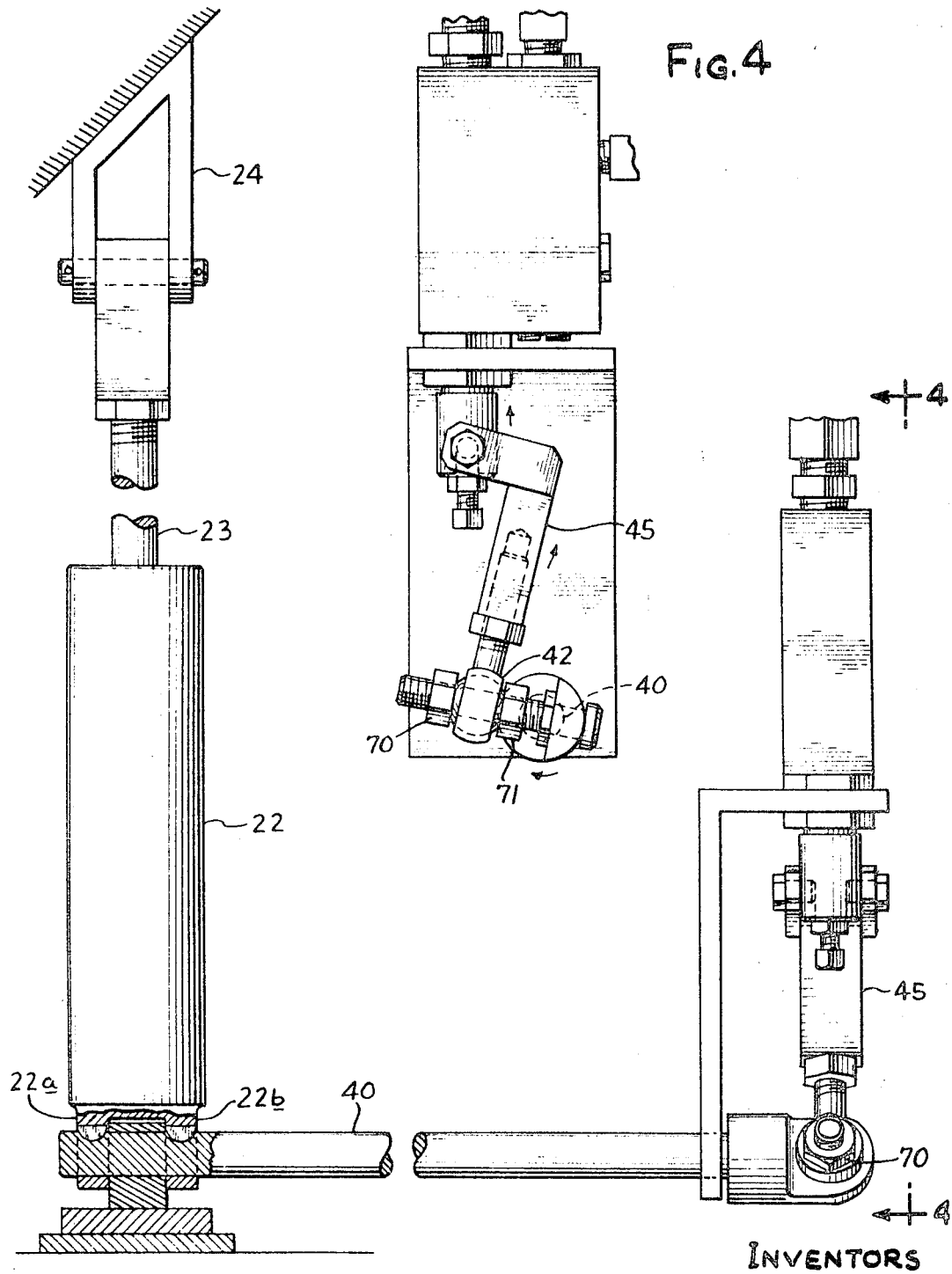

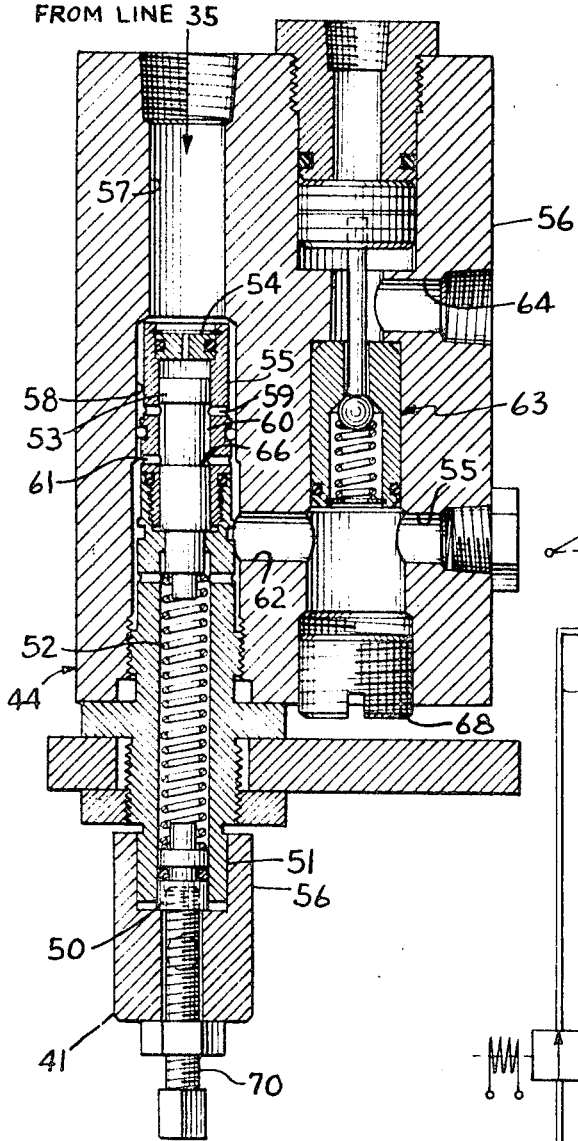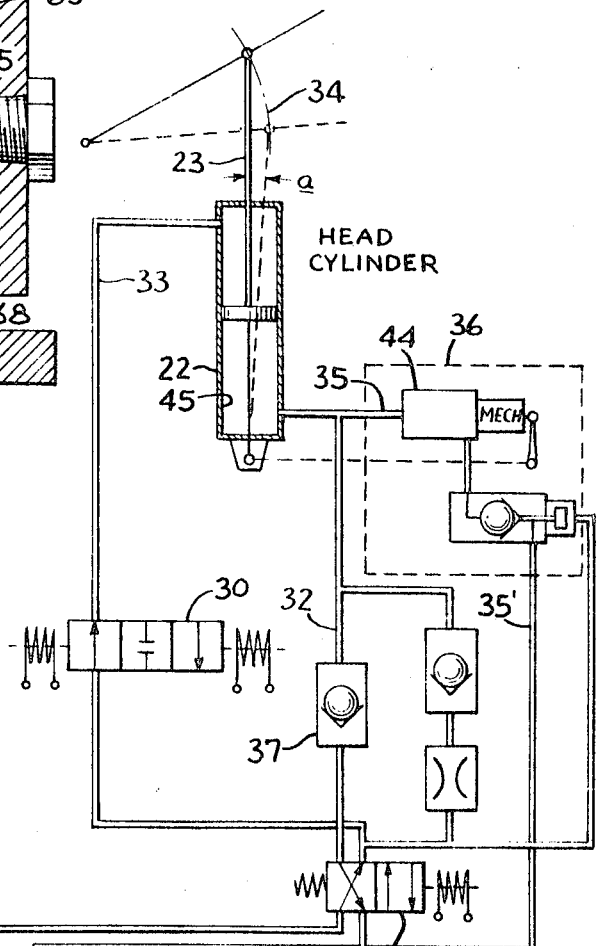

INVENTORS
FREDERICK J. BLUM, JR.
HENRY KOMENDOWSKI 3,460,420
FEED PRESSURE CONTROL SYSTEM FOR
HINGE TYPE HORIZONTAL BANDSAW
Henry Komendowski and Frederick J. Blum, Jr., Chicago, Ill., assignors to Armstrong-Blum Manufacturing Company, Chicago, Ill., a corporation of Illinois
Filed Sept. 19, 1966, Ser. No. 580,262
Int. Cl. B26d 1/54
U.S. Cl. 83—201.07
5 Claims

ABSTRACT OF THE DISCLOSURE

A hinge-type horizontal bandsaw having a control system for automatically compensating for the variations in gravitational forces acting on the saw head as it is tilted about its hinge point, so as to maintain a substantially constant feed pressure during the feeding movement of the saw head. The tilting movement of the saw head is controlled by a hydraulic cylinder which is pivotally mounted, and a compensating valve in the hydraulic system responds to the pivotal movement of the head cylinder so as to vary the hydraulic pressure within the head cylinder in accordance with variations in the gravitational forces.

---

The present invention relates generally to horizontal bandsaws and, more particularly, to hinge-type horizontal bandsaw having an improved control system for controlling the feed pressure of the saw.

It is a primary object of this invention to provide an improved hinge-type horizontal bandsaw having an improved control system capable of maintaining a substantially constant feed pressure on the continuous bandsaw blade while it is being fed through a workpiece.

It is a related object of the present invention to provide an improved horizontal bandsaw of the foregoing type having an improved control system which compensates for the variations in gravitational forces acting on the saw head while it is being lowered. A more particular object of the invention is to provide such a bandsaw in which the control system provides a substantially linear feed pressure characteristic by providing proportional compensation for the varying gravitational forces acting on the saw head as it is tilted about its hinge point.

A still further object of the present invention is to provide an improved horizontal, hinge-type bandsaw which permits more efficient cutting operations. In this connection, another object of the invention is to provide such an improved horizontal bandsaw which requires a minimum of maintenance time, with attendant reductions in machine down time and operating costs.

It is a further object of this invention to provide an improved horizontal bandsaw of the type described above which substantially reduces blade breakage.

Other objects and advantages of the invention will become apparent from the following description and upon reference to the accompanying drawings, in which:

FIG. 3 is an enlarged fragmentary elevation, partially in section, of the mechanical linkage associated with the lower end of the head cylinder and forming a part of the improved control system provided by the invention;

FIG. 4 is an end elevation view taken along line 4—4 in FIGURE 3;

FIG. 5 is a schematic diagram of a portion of the hydraulic control system included in the bandsaw of FIGURE 1;

FIG. 6 is a vertical section of a hydraulic valve arrangement included in the hydraulic control system shown in FIG. 5;

While the invention is described in connection with certain preferred embodiments, it will be understood that is not intended to limit the invention to these particular embodiments. On the contrary, it is intended to cover all alternatives, modifications, and equivalents as may be included within the spirit and scope of the invention as defined by the appended claims.

Figure 1:
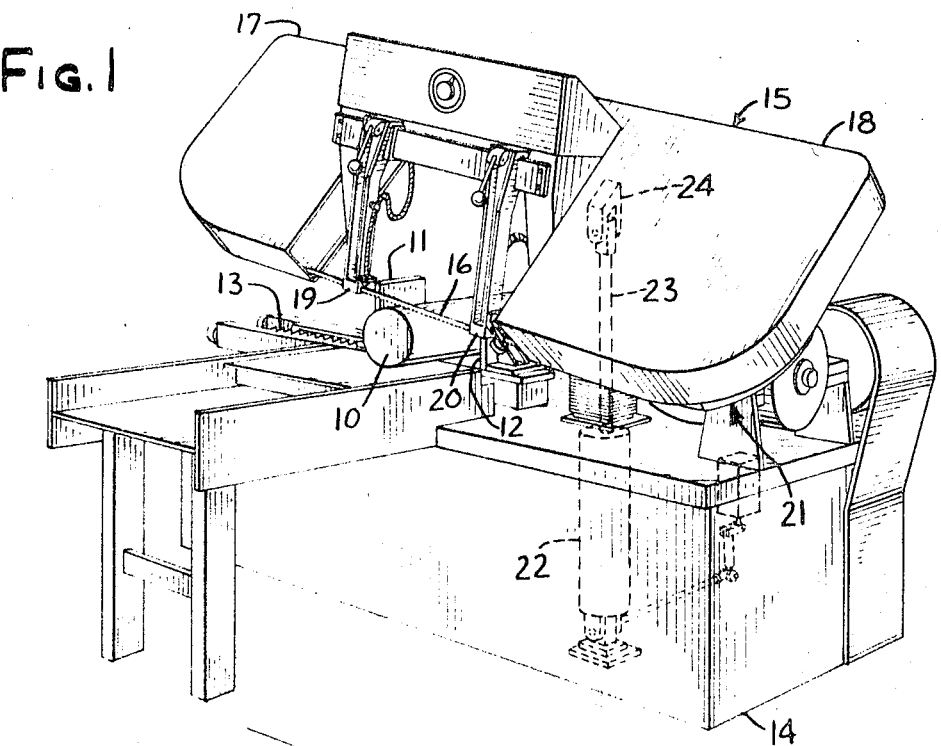
FIGURE 1 is a perspective view of a horizontal hinge-type bandsaw embodying the present invention.

Turning now to the drawings, and referring first to FIGURE 1, there is shown a hydraulic, hinge-type, horizontal bandsaw for making repetitive high speed cuts through an elongated workpiece 10. The workpiece is fed into the bandsaw along a horizontal table by means of a conventional feeding mechanism such as a feed shuttle. During the cutting operation, the workpiece is held firmly in position by means of a hydraulically operated vise including a pair of opposed jaws 11 and 12. Hydraulic clamping pressure is applied to the left-hand jaw 11, as viewed in FIGURE 1, through a ratchet 13 powered by an integral hydraulic cylinder. If desired, a screw adjustment may be provided on the piston rod associated with the hydraulic cylinder for permitting reduction of clamping pressure to prevent distortion of light gauge workpieces.

The workpiece table and feed mechanism of the illustrative bandsaw are mounted on a supporting frame or base member 14, which also supports one end of the saw head 15. The saw head 15 includes a conventional pair of horizontally spaced band wheels carrying a continuous bandsaw blade with an exposed length 16 of the blade being disposed directly over the work table. A head frame carries the two band wheels for rotation inside two spaced housing sections 17 and 18, with the right-hand wheel, inside the housing section 18, being driven by a suitable motor. For the purpose of guiding the exposed length 16 of the bandsaw blade, a pair of similar guide members 19, 20 depend from the head frame and fit over the blade 16 on opposite sides of the workpiece. These guide members 19, 20, which also provide backup support for the blade 16, are preferably of the type described in U.S. Patent No. 2,914,101, "Saw Blade Backstop," so as to provide accurate guidance along with a long operating life.

In order to permit the saw head 15 to be raised and lowered with respect to the work table, for cutting the workpiece, one end of the head is hinged to the base member 14, as at 21 in FIGURE 1. The raising and lowering of the head is effected by a hydraulic cylinder 22 anchored to the machine base 14, this cylinder also serving as a support for the saw head. Hydraulic pressure within the cylinder 22 controls the operation of a piston rod 23 which extends upwardly from the cylinder 22 and is pivotally secured at its upper end to the head frame by a bracket 24. Consequently, as the piston rod 23 is advanced upwardly, it tilts the saw head 15 upwardly about its hinged connection to the base 14, so that the bandsaw blade 16 is moved upwardly, i.e., retracted from the work table. Conversely, when the piston rod 23 is retracted, the head 15 is lowered or advanced toward the work table.

A suitable control system for automatically raising and lowering the saw head during a repetitive cutting operation is described in copending application Ser. No.

580,414, entitled Hinge Type Horizontal Band Saw with Improved Control System filed concurrently herewith and assigned to a common assignee. Referring to FIGURE 5, the head-actuating cylinder 22 raises and lowers the saw head in response to the settings of a pair of solenoid-operated valves 30 and 31 which, in turn, are controlled by cam-operated limit switches as described in the aforementioned copending application, filed concurrently herewith. When the saw head is being raised, the valves 30 and 31 are in the positions designated R in the schematic diagram of FIG. 5, so that hydraulic fluid pumped through a hydraulic line 32 and returned through the line 33 advances the piston rod 23 to raise the saw head. When the saw reaches the end of its cutting movement, the valves 30 and 31 are automatically switched to the positions represented schematically as L so that hydraulic fluid pumped through a line 33 and returned through lines 35 and 35' retracts the piston rod 23 to lower the saw head.

In accordance with the present invention, proportional compensating means are provided for controlling the downward movement of the saw head to maintain a substantially constant feed pressure on the saw blade as the head is lowered. The blade then progresses through the workpiece only as fast as it can remove the metal at the constant feed pressure. Thus, in the particular embodiment illustrated, automatic control means are provided for varying the hydraulic pressure in the head cylinder 22 in response to the tilting movement of the saw head so as to compensate for the varying gravitational forces acting on the saw head and thereby maintain a substantially constant feed pressure on the saw blade 16 throughout each cutting movement. The hydraulic portion of the automatic compensating means, enclosed by broken lines 36 in FIG. 5, is connected in the return line 35, and is mechanically coupled to the base of the head cylinder 22 by an arrangement described in more detail below. A check valve 37 in the hydraulic line 32 functions to bypass the hydraulic line 35 whenever the head is being raised, so that the compensating means 36 is hydraulically operative only during the lowering movement of the head. More particularly, the check valve 37 opens the line 32 when the valves 30, 31 are in the R positions, and then closes the line 32 when the valves are in the L position to direct the hydraulic fluid through line 35 and the compensating means associated therewith. An additional check valve 63 associated with the compensating means, to be described below, also closes the line 35 so that any fluid passed by the valve 37 to raise the head is directed into the head cylinder 22 rather than being returned through the compensating means.

Figure 2:
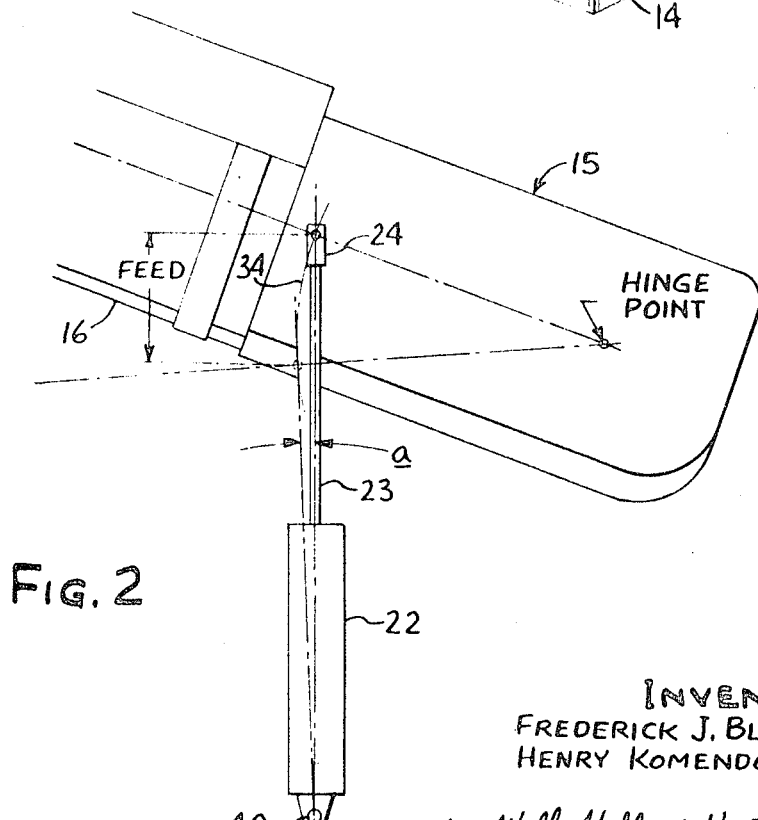
FIG. 2 is a fragmentary perspective view showing the hinged end of the saw head and the associated hydraulic cylinder for raising and lowering the head.

Referring to FIGS. 2–5, as the saw head descends the pivotal connection between the head and the piston rod 23 follows an arcuate path, designated 34 in FIGS. 2 and 5, thereby tilting the piston rod 23 and the head cylinder 22 through an angle $a$. The path 34 can be defined more specifically as an arcuate segment of a circle having its center at the hinge point 21 and a radius equal to the distance between the hinge point 21 and the bracket 24. Similarly, the angle $a$ is the angle between two lines drawn from the two ends of the arcuate path 34 to the fixed lower end of the cylinder 22.

The tilting movement of the piston rod 23 and head cylinder 22 causes corresponding angular movement of a shaft 40 which is secured to the lower end of the cylinder 22 through an angle $a$. The path 34 can be defined 22a, 22b. In one commercial embodiment of the invention, the shaft 40 rotates 3° during one complete transverse of the saw head, but it will be understood that the degree of movement may be varied without departing from the invention. This rotational movement of the shaft 40 is translated into linear movement of a valve actuator 41 by means of a universal ball joint 42 and an L-shaped mechanical line 43. Linear movement of the actuator 41 controls a valve 44 (FIG. 5) connected in hydraulic circuit with the head cylinder 22 and hydraulic line 35 so as to vary the hydraulic pressure within the cylinder as a function of the angular movement of the shaft 40 (which in turn is a function of the tilting movement of the saw head), during lowering (feeding) movement of the head. Consequently, the hydraulic pressure applied to the saw head during lowering movement thereof, is varied in inverse proportion to the varying gravitational pressures acting on the saw head, so that the net feed pressure on the saw blade is maintained substantially constant throughout each cutting traverse.

Referring particularly to FIG. 5, the valve 44 functions to gradually increase the hydraulic pressure in the lower chamber 45 of the head cylinder 22 while the saw head is being lowered, so as to compensate for the increasing gravitational forces acting on the saw head as it is tilted downwardly about its hinge. When the saw head is raised, the valve 44 is isolated from the hydraulic circuit, but it is mechanically returned to its starting position for the next compensating operation (during the next downward movement). The system is designed to vary the hydraulic pressure in direct proportion to the variations in feed pressure caused by the variations in gravitational forces acting on the head, so that the net result is a substantially constant blade feed pressure.

Figure 7:
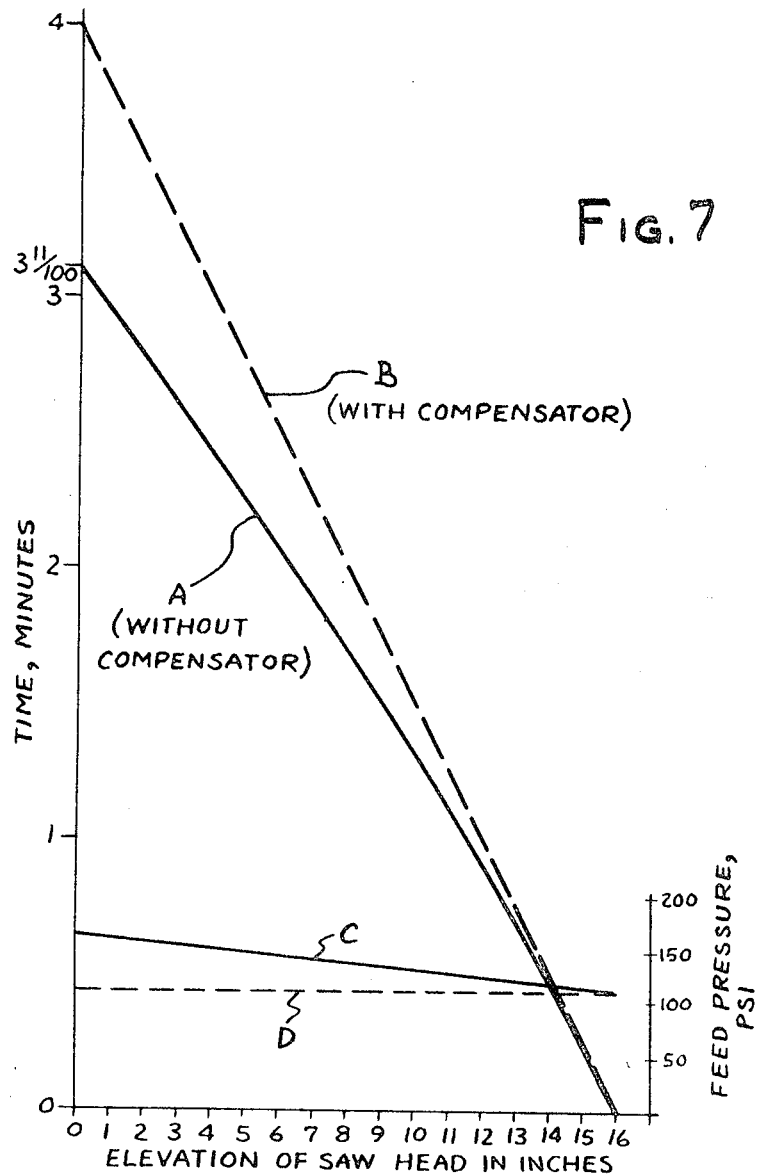
FIG. 7 is a graph showing the head feed rate and blade feed pressure characteristics for a bandsaw of the type shown in FIGURE 1 with and without the control system of this invention.
Figure 8:
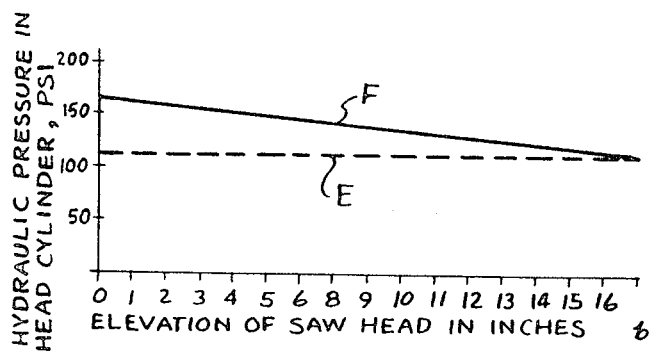
FIG. 8 is a graph showing the hydraulic pressure applied to the head cylinder as a function of the head elevation.

The performance characteristics of the illustrative band saw both with and without the proportional compensator provided by this invention are illustrated by the graphs in FIGS. 7 and 8. Thus, in FIG. 7 the two curves A and B show the rate of movement of the saw head through a typical cutting traverse with and without the feed pressure compensator, each curve representing a plot of the saw head elevation as a function of time. Curve A represents the rate of movement of the saw head without the compensator, and it can be seen that the rate gradually increases as the head is lowered, i.e., the head accelerates as it descends due to the increasing gravitational forces acting on the head as it approaches a horizontal position. This, of course, is caused by the increasing horizontal distance between the free end of the head and its hinge point. Curve B represents the rate of movement of the saw head with the inventive compensator, and it can be seen that the feed rate remains constant over the entire range of head elevation. In other words, the compensator cancels out the effect of the varying gravitational forces acting on the saw head, so as to provide a substantially linear feed rate characteristic.

The two curves at the bottom of FIG. 7 show the variations in feed pressure as a function of the head elevation, again both with and without the compensator. As can be seen from curve C, without the compensator, the feed pressure gradually increases as the head is lowered, as would be expected from the non-linear feed rate characteristic exemplified by curve A. Curve D represents the feed presure characteristic when the saw head is provided with the inventive compensator, and it can be seen that the feed pressure remains essentially constant over the entire range of head movement.

The function of the compensator is shown more clearly in FIG. 8, which includes two curves E and F representing the variations in hydraulic pressure in the head cylinder as a function of head elevation, with and without the compensator. Curve E shows the hydraulic pressure characteristic without the compensator, and it can be seen that the pressure remains essentially constant over the entire range of head movement, so that the varying gravitational forces acting on the head give rise to the non-linear feed rate characteristic illustrated by curve A. Curve F shows the hydraulic pressure characteristic with the compensator, and it can be seen that the characteristic is identical to the non-compensated feed pressure characteristic, curve C. Thus, as the saw head is lowered, the compensator increases the hydraulic pressure in direct proportion to the increase in gravitational pressure, thereby nullifying the effect of the variation in gravitational pressure to provide the desired constant feed pressure illustrated by curve D in FIG. 7.

It will be appreciated that a number of different systems can be devised for varying the hydraulic pressure in response to tilting movement of the saw head. In the particular embodiment illustrated, the valve 44 is used to increase the resistance to flow of hydraulic fluid through the line 35 in response to descending movement of the saw head, thereby gradually increasing the hydraulic pressure in cylinder chamber 45. The valve is then mechanically returned to its starting position during ascending movement of the head, while isolated from the hydraulic circuit, to make ready for the next descending movement. It will be understood that different valve arrangements may be utilized to control the hydraulic pressure in the head cylinder 22 in response to movement of the mechanical linkage 42. In the particular valve 44 shown in FIGURE 6, the actuator 41 includes a plunger 50 which is moved axially within a sleeve 51 whenever the actuator 41 is moved by the linkage 42. Axial movement of the plunger 50 controls the pressure applied by a spring 52 to one end of a movable valve member 53 at the other end of the sleeve 51. The other end of the movable valve member 53 is exposed to the pressure of the fluid in hydraulic line 35 through an axial passageway in an end closure 54, so that in effect, the member 53 is balanced between the spring 52 and the hydraulic fluid in line 35. The movable valve member 53 is slidably mounted within a stationary valve member 55 threaded into the end of the sleeve 51, and this entire assembly is contained within a casing 56 and fastened thereto by means of a threaded connection between the sleeve 51 and casing 56.

During lowering movement of the saw head, when the check valve 37 is closed, hydraulic fluid enters the casing 56 from hydraulic line 35 via a port 57, and flows therefrom into an annular passageway 58 formed between the stationary valve member 55 and the main casing 56. From the annular passageway 58, the hydraulic fluid flows inwardly through radial ports 59 into an axial passageway 60 formed in the movable valve member 53, and then back into the annular passageway 58 through a second set of radial ports 61. An O-ring 62 seated in the outer surface of the stationary valve member 55 provides a fluid seal between the two sets of radial ports 59 and 61 so that the hydraulic fluid cannot bypass the inner passageway 60. After the hydraulic fluid has been returned to the annular passageway 58, it flows out of the relief valve through an exit port 62 into a check valve 63, which passes the fluid into a return port 64 connected to hydraulic line 35 to return the fluid to tank.

As the saw head 15 is lowered, hydraulic pressure in line 35, and thus in the head cylinder 22, is controlled by axial movement of the movable valve member 53, which in turn is controlled by axial movement of the plunger 50 included in the valve actuator 41. As the valve member 53 is advanced by upward movement of the plunger 50, a shoulder 66 on member 53 partially blocks the openings to the radial ports 61, thereby restricting the flow of hydraulic fluid and increasing the pressure in line 45 and thus in the head cylinder 22. As will be apparent from the foregoing description of the performance characteristics for the illustrative machine, this advancing movement of the valve member 53 is effected during downward movement of the saw head so as to compensate for the increasing gravitational forces. When the head is raised, the valve actuator 41 is lowered so as to reduce the biasing pressure of the spring 52 whereby the valve member 53 is retracted under the pressure of the hydraulic fluid at its upper end. This retracting movement withdraws the shoulders 66 to clear the openings to the ports 61, thereby returning the valve member 53 to its starting position for the next compensating operation when the head is lowered again.

The primary function of the check valve 63 is to close the hydraulic line 35 when the head is being raised, and to prevent the saw head from dropping when the machine is shut off. Thus, when hydraulic pressure is removed from a pilot line 67 connected to the check valve 63, as occurs during upward movement of the saw head, the valve immediately closes so as to maintain hydraulic pressure within the head cylinder 22. A number of different check valves may be used for this application, but the particular check valve 63 illustrated is available from Kepner Products Co. (Catalogue No. 2206-1-5). The cavity provided in the casing 56 to receive the check valve 63 is closed by means of a threaded plug 68.

When the saw head is being lowered, a fixed flow control valve 80 (pressure compensated) feeds an extra supply of hydraulic fluid through a hydraulic line 81 into the compensator 36 to insure a continuous flow of oil through the compensator while it is hydraulically operative. This tends to prevent sticking of the movable valve parts to provide a highly reliable compensating function. A check valve 82 connected in series with the flow control valve 80 prevents any return flow of hydraulic fluid through the line 81.

In accordance with one particular aspect of this invention, the compensating means is provided with a fine adjustment so that the desired constant feed pressure may be attained in spite of small manufacturing variations or different installation environments. Thus, the spacing between the ball joint 42 and the shaft 40 may be adjusted by turning the two nuts 70 and 71 associated with the ball joint. This in effect varies the lever arm between the shaft 40 and the mechanical linkage 42 so that the resulting linear movement of the valve actuator 41 is adjusted accordingly to provide the desired proportionality. In practice, this adjustment is made while observing the feed pressure, so that the ball joint 42 is set at the position where the feed pressure remains substantially constant over a complete feeding traverse of the saw head.

In order to permit a "zero" adjustment of the valve 44, so that the saw head 15 remains at a given position, without rising or falling, when the machine is in neutral, a vertical adjustment screw 73 is provided on the valve actuator 41. The upper end of the screw 73 is secured to the plunger 50, while the lower head end of the screw is exposed for each manual adjustment. The screw is threaded through a nut 74 fitted against the lower end of the actuator casing so that rotation of the screw results in axial movement of both the screw 73 and the plunger 50. In practice, the pin 70 is manually adjusted until the saw head stops dead while the machine is in neutral.

As can be seen from the foregoing detailed description, this invention provides an improved control system which enables a hinge type horizontal bandsaw to maintain a substantially constant feed pressure on the continuous bandsaw blade while it is being fed through a workpiece. The control system compensates proportionally for the variations in gravitational forces acting on the saw head while it is being fed, so as to provide a substantially linear feed pressure characteristic. This control system permits more efficient cutting operations with a hinge type horizontal bandsaw with minimum of maintenance time and attendant reductions in machine down time and operating costs. Since a substantially constant feed pressure is maintained on the blade, the control system provided with this invention also substantially reduces blade breakage.

We claim as our invention:

1. In a hinge-type horizontal bandsaw, the combination comprising a fixed base member incluudng means for receiving and holding a workpiece to be cut, a saw head disposed above said base member and including a pair of spaced band wheels carrying a continuous bandsaw blade, said saw head being hinged at one end to said fixed base member to permit upward and downward tilting movement of the head relative to the workpiece, a hydraulically operated head cylinder operatively associated with said saw head for tilting the same upwardly and downwardly about its hinged connection to said base member, said head cylinder being pivotally mounted for pivotal movement in response to the tilting movement of said saw head, and hydraulic valve means operatively connected to said head cylinder and responsive to said pivotal movement of said head cylinder for varying the hydraulic pressure in said head cylinder in accordance with the variations in gravitational forces acting on the saw head as it is tilted about its hinged connection to said base member so as to maintain a substantially constant feed pressure on the saw blade as the head is lowered.

2. In a hinge-type horizontal bandsaw, the combination comprising a fixed base member including means for receiving and holding a workpiece to be cut, a saw head disposed above said base member and including a pair of spaced band wheels carrying a continuous bandsaw blade, said saw head being hinged at one end to said fixed base member to permit upward and downward tilting movement of the head relative to the workpiece, hydraulically operated actuating means associated with said saw head for tilting the same upwardly and downwardly about its hinged connection to said base member, and proportional compensating means operatively associated with said actuating means for automatically varying the hydraulic pressure in said actuating means in response to the downward tilting movement of the saw head so as to maintain a substantially constant feed pressure on the saw blade as the head is lowered.

3. In a horizontal bandsaw, the combination comprising a fixed base member including means for receiving and holding a workpiece to be cut, a cutting head disposed above said base member and including a pair of spaced band wheels carrying a continuous bandsaw blade, said cutting head being hinged at one end to said fixed base member to permit pivotal upward and downward movement relative to the workpiece, actuating means associated with said cutting head for pivoting the same upwardly and downwardly about its hinged connection to said base member, and automatic compensating means associated with said cutting head and said actuating means for controlling the rate of downward and upward movement of the head, said compensating means including means for applying a continuous biasing force to said cutting head during downward movement thereof and means responsive to pivotal movement of said cutting head for continuously and automatically varying said biasing force in accordance with the variations in gravitational forces acting on the cutting head as it is pivoted about its hinged connection to the base member so as to maintain a substantially constant feed pressure on the saw blade as the head is lowered.

4. A horizontal bandsaw as defined in claim 3 in which said actuating means is hydraulically operated and said means for applying a biasing force to said cutting head includes means responsive to pivotal movement of said cutting head for automatically varying the hydraulic pressure in said actuating means in proportion to the variations in gravitational forces acting on the cutting head as it is pivoted about its hinged connection to the base member.

5. A horizontal bandsaw as defined in claim 3 in which said actuating means is hydraulically operated and said compensating means includes means responsive to tilting movement of said cutting head for increasing the hydraulic pressure in said actuating means in proportion to the increasing gravitational forces acting on the cutting head as it is moved downwardly about its hinged connection to the base member so as to maintain a substantially constant feed pressure on the bandsaw blade cutting the workpiece, and means for bypassing said compensating means during upward movement of said cutting head about its hinged connection to the base member.

References Cited
UNITED STATES PATENTS

| | | | |
|---|---|---|---|
| 2,594,548 | 4/1952 | Flick | 83—201 |
| 2,601,576 | 6/1952 | Wells et al. | 83—201.06 |

FRANK T. YOST, Primary Examiner

U.S. Cl. X.R.

83—19, 639, 647